United States Patent
Matsushita

[11] Patent Number: 6,021,279
[45] Date of Patent: *Feb. 1, 2000

[54] COLORIMETRIC DEVICE FOR USE IN A CAMERA

[75] Inventor: Tsuyako Matsushita, Yokohama, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/678,789

[22] Filed: Jul. 11, 1996

[30] Foreign Application Priority Data

Jul. 11, 1995 [JP] Japan .................................. 7-174599

[51] Int. Cl.⁷ .............................. G03B 7/00; G03B 7/02; G03B 17/18
[52] U.S. Cl. .......................................... 396/225; 369/281
[58] Field of Search .................................. 396/275, 281, 396/100, 104, 283, 225; 356/404, 408; 348/272, 273, 282, 223, 225

[56] References Cited

U.S. PATENT DOCUMENTS

| | | |
|---|---|---|
| Re. 34,926 | 5/1995 | Hieda et al. ............................. 348/223 |
| 4,272,176 | 6/1981 | Maitani et al. .......................... 354/238 |
| 4,335,943 | 6/1982 | Numata ................................. 354/60 |
| 4,335,959 | 6/1982 | Manning ................................. 356/218 |
| 4,389,118 | 6/1983 | Yuasa et al. ............................. 356/404 |
| 5,030,981 | 7/1991 | Matsuzuki et al. ...................... 354/402 |
| 5,031,049 | 7/1991 | Toyama et al. ......................... 358/227 |
| 5,053,871 | 10/1991 | Ogawa et al. ........................... 358/209 |
| 5,351,080 | 9/1994 | Kyuma et al. .......................... 348/225 |
| 5,371,655 | 12/1994 | Murdock et al. ......................... 362/18 |
| 5,389,969 | 2/1995 | Suzuki et al. ............................ 348/223 |
| 5,469,239 | 11/1995 | Ishida et al. ............................. 354/402 |
| 5,504,524 | 4/1996 | Lu et al. ................................. 348/223 |
| 5,521,589 | 5/1996 | Mandrosch et al. ............... 340/825.36 |

FOREIGN PATENT DOCUMENTS 5-53218  8/1993  Japan .

OTHER PUBLICATIONS

Electronics Now, vol. 65, No. 5., "Low Cost Colorimeter", pp. 45–48, J. Schnable, G. Alessandro and R. Orr, May 1994.

*Primary Examiner*—Safet Metjahic
*Assistant Examiner*—Christopher E. Mahoney

[57] ABSTRACT

A colorimetric device, particularly suitable for a camera, that provides reliable color data so that a subject field is photographed with appropriate color balance. A CPU reads out sensor data $D_B$, $D_R$ corresponding to red (R) and blue (B) light components of an incident light from the subject field a light sensor or photometric element disposed in the camera. Next, the CPU compares the sensor data $D_B$ of the B color component, and the sensor data $D_R$ of the R color component, with a predetermined standard value K1, and when it is determined that either of the sensor data $D_B$ of the B color component, or the sensor data $D_R$ of the R color component, is below the standard value K1, a "measurement impossible" display is performed for a color temperature T and a balance value LB. On the other hand, if both sensor data $D_B$, $D_R$ are greater than the standard value K1, the color temperature T and the light balance value LB are calculated by a calculation circuit. The color temperature T and the light balance value LB are displayed.

19 Claims, 8 Drawing Sheets

COLORIMETRIC DEVICE FOR USE IN A CAMERA

CROSS REFERENCE TO RELATED APPLICATIONS

This application is based upon and claims priority from Japanese Patent Application No. 07-174599 filed Jul. 11, 1995, the contents of which are incorporated herein by reference.

BACKGROUND OF THE INVENTION

1. Field of the Invention

The present invention relates to a colorimetric device which measures color data used so that a subject field is photographed with appropriate color balance.

2. Description of the Related Art

In order to photograph a subject field with an appropriate color balance, there are cases in which color filters are loaded onto a camera for corrective use. Heretofore, a photographer using a colorimetric device in order to select an appropriate color balance, performed photometry of the balance of an incident light (red, blue, green), a color temperature of the subject field, a light balancing factor (LB value), and a color compensating factor (CC value). Furthermore, on obtaining color data for the proposed filter, corresponding to this light balancing factor and color compensating factor, a predetermined color filter is selected based upon the color data.

However, the color temperature and light balancing factor, among the color components incident from the subject field, were calculated using the photometric values of the red and blue color components, while the color compensating factor was calculated using the photometric values of the red, green and blue color components.

Moreover, when the photometric value of the green color component was less than a predetermined standard value, prior colorimetric devices determined that accurate color data could not be calculated, and that the photometric value did not have reliability, and performed a display to this effect, warning the photographer. Such technology was disclosed in, for example, Japanese Patent Publication No. JP 5-53218.

Nevertheless, in the above manner, the prior colorimetric devices, because they calculated the color temperature and color balancing factor using the photometric values of the red color component and the blue color component, have the problem that when the photometric value of the green color component is above the standard value, the color temperature and color balancing factor were calculated as being reliable and were displayed, even in the case where one of the red and blue color components was insufficient. These calculations occurred in spite of the fact that there was in fact no reliability.

SUMMARY OF THE INVENTION

Accordingly, it is an object of the present invention to obtain reliable color data in a colorimetric device.

Objects of the present invention are achieved by a colorimetric device comprising a photometric element to measure light divided into each of a plurality of color components of incident light from a subject field, a decision circuit to compare the measured values of each of the plurality of color components measured by the photometric element with a predetermined photometric value and to decide whether or not the photometric values have reliability, and a calculating circuit to calculate color data in order to reproduce the subject field with an appropriate color balance, using the measured values.

Such a colorimetric device is well suited for use in a camera. This colorimetric device can have a warning output device which outputs a warning signal when it is decided by the decision circuit that the measured values do not have reliability. This warning output device can be such that a display is caused such that the warning signal can be visually perceived.

In this colorimetric device there can furthermore be disposed a display device, which can cause a display therein, of a warning signal including at least one of characters, numerals, or icons in the warning output device.

In this colorimetric device there can furthermore be disposed a light generating device which generates light. The light generating device can generate light, which is used as a warning output, in the warning output device.

In the warning output device, the output can be a warning sound, such that the warning signal can be audibly recognized.

The photometric element can be such as to cause photometry of the light incident from the subject field, separated into red, green and blue color components. The photometric element can also be such as to cause photometry of the light incident from the subject field, separated into yellow, magenta and cyan color components.

In the colorimetric device having such a construction, a CPU compares the photometric value of each of the red, green and blue color components with a predetermined value and determines whether or not this photometric value is reliable. Then, when the photometric value is determined not to have reliability, an indication that the measurement is impossible is displayed on the color data display device.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
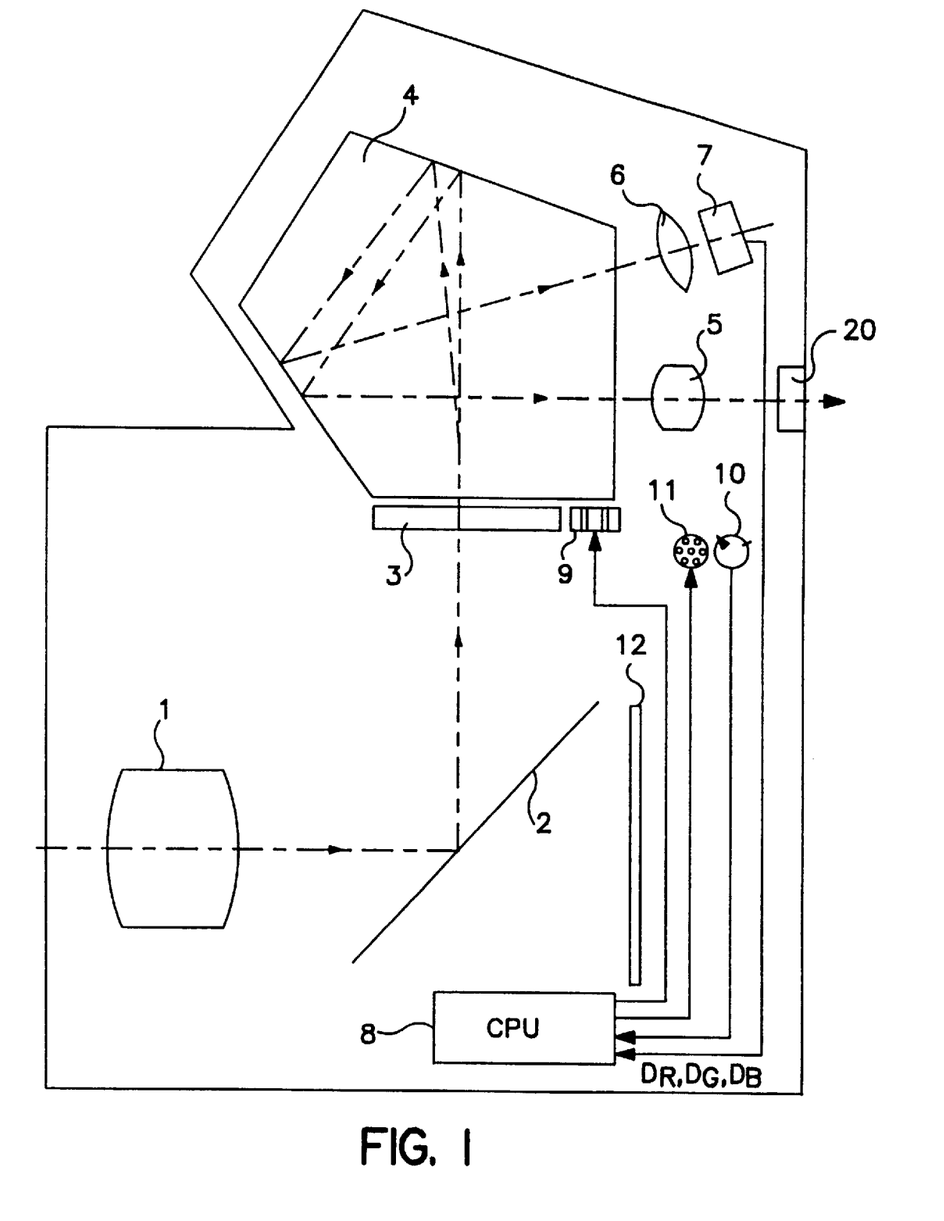
FIG. 1 is a diagram illustrating a colorimetric device as used in a camera according to a first preferred embodiment of the present invention.

FIG. 1 is a diagram showing a preferred embodiment of a camera to which the colorimetric device according to the present invention has been applied. A photographic lens 1 causes incidence of light from the subject field. A reflecting mirror 2 causes this incident light to be reflected to a focusing screen 3. The reflected light forms an image on the focusing screen 3. Moreover, a pentaprism 4 reflects the light imaged on the focusing screen 3, causing formation of an image in an eyepiece lens 5, and the photographer can perceive the subject field imaged on the focusing screen 3.

A photometric lens 6 causes incidence on a photometric element 7 of light coming from the pentaprism 4. The photometric element 7 performs photometry of each of the red (R), green (G) and blue (B) color components of the light, and outputs the photometric value of each of the color components $D_R$, $D_G$, and $D_B$ to a CPU 8.

The CPU 8, using the photometric values input from the photometric element 7, calculates the color temperature, light balancing factor (LB value) and color compensating factor (CC value), which are color data of the subject field used in order to obtain a suitably color balanced image of the subject field.

Moreover, the CPU 8 performs a determination of whether or not the photometric value of each color component which was input from the photometric element 7 is greater than a predetermined standard value as described further below. In the case where the photometric value is below the standard value, a display of a "measurement impossible" in a color data display device 9 is exhibited, or a speaker 10 emits a sound which warns that measurement is impossible. Further details of the display are explained below.

A warning signal changeover dial 11 operates the selection of a display mode which displays "measurement impossible" on the color data display device 9. Alternatively, a warning mode is entered which causes a warning sound to be output as a "measurement impossible" warning sound by the speaker 10. Either or both of these warnings occur in the case where the photometric value of each color component of the subject field which was measured by the photometric element 7 is below the standard value.

The color data display device 9 is arranged in a position which is visible in the lower portion of the image of the focusing screen 3, and when observed via the eyepiece lens 5 and a viewfinder 20, display device 9 provides a display of the parameters calculated by the CPU 8. That is, the photographer, by viewing through the eyepiece lens 5 and viewfinder 20, can confirm the subject field and in addition the parameters displayed by the color data display device 9.

When a release button (not shown in the drawing) is fully depressed, the subject field is imaged on a film 12.

Figure 2:
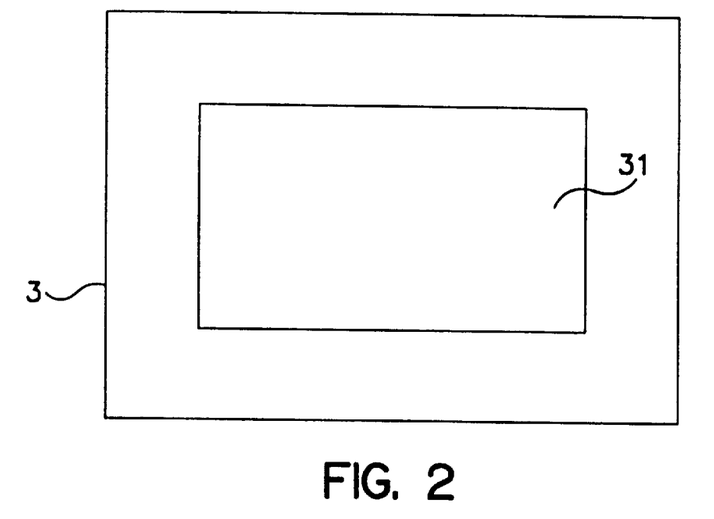
FIG. 2 is a diagram showing an example of the colorimetric range on the focusing screen of the colorimetric device of FIG. 1.

FIG. 2 is a diagram showing an example of the focusing screen 3 for the colorimetric device. The light of the subject field, reflected by the reflecting mirror 2 in FIG. 1, is imaged on the focusing screen 3 as shown in FIG. 2. The range of photometry by the photometric element 7 for the colorimetric device of FIG. 1, in the case of the present embodiment, is within the central region 31 in the focusing screen 3 shown in FIG. 2.

Figure 3:
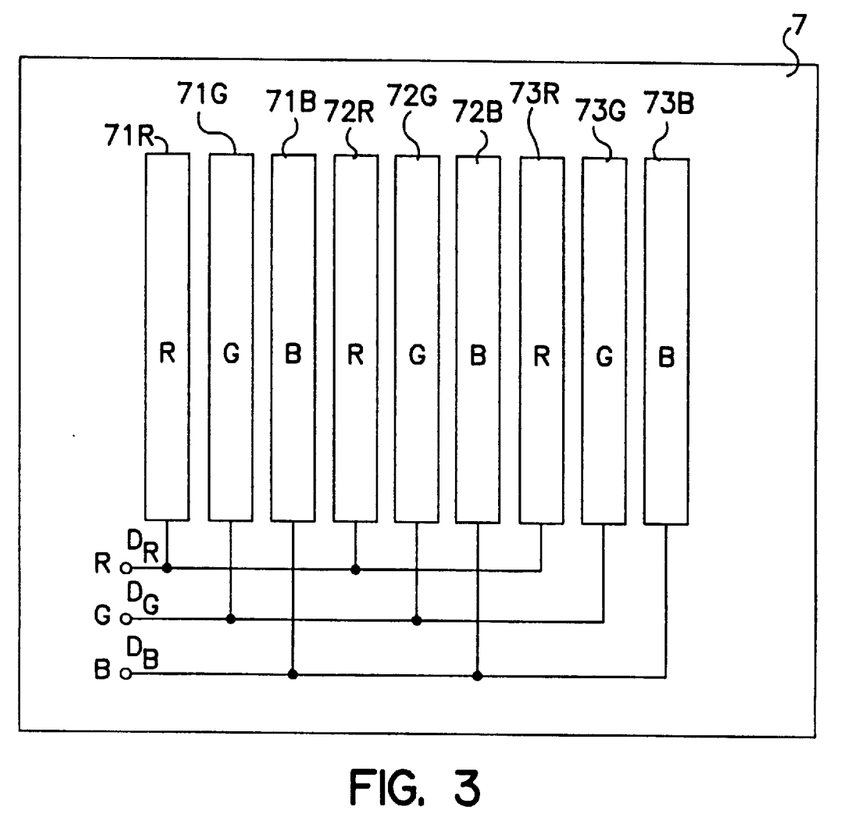
FIG. 3 is a diagram depicting the photometric element 7 for the colorimetric device of FIG. 1.

FIG. 3 is a diagram showing an example of the photometric element 7 for the colorimetric device of FIG. 1. The photometric element 7 comprises a one-chip type of color sensor using stripe filters. In this embodiment, it includes color filters which have been mounted on the whole surface of the photosensor divided into nine strips. That is, it includes photosensors 71R, 72R, 73R with red (R) color filters, photosensors 71G, 72G, 73G with green (G) color filters, and photosensors 71B, 72B, 73B with blue (B) color filters, respectively mounted thereon.

In this manner, there are respectively obtained the photometric value of the R component by the photosensors 71R–73R, the photometric value of the G component by the photosensors 71G–73G, and the photometric value of the B component by the photosensors 71B–73B. These photometric values, respectively added for each color component, are transmitted to the CPU 8 as sensor data $D_R$ of the R component, as sensor data $D_G$ of the G component, and as sensor data $D_B$ of the B component.

Moreover, in this embodiment, for the sake of simplicity, the photometric element 7 includes nine photosensors 71R–73R, 71G–73G and 71B–71G, of divided strip form. In actuality, however, in order to collect the data of each color component of the incident light, the photosensors are divided into a very large number of strips. Moreover, the photosensors 71R–73R, 71G–73G, and 71B–73B are arranged in positions which are to some degree of obscure focus. Uniform light is such as to illuminate the strip-shaped respective photosensors 71R–73R, 71G–73G, 71B–73B.

Moreover, in the present embodiment, the photometric element 7 measures each divided color component or red, green and blue, but it is alternatively possible for yellow, magenta and cyan color components to be each divided and measured.

The operation of the embodiment shown in FIGS. 1–3 is described below with reference to the flow charts of FIGS. 4–6.

The light of the subject field is incident in the camera interior via the imaging or photographic lens 1. This incident light, reflected by the reflecting mirror 2, is imaged in the focusing screen 3. This imaged light is furthermore twice reflected in the pentaprism 4 and forms an image by the eyepiece lens 5. The photographer confirms the subject field by observing this image.

Figure 4:
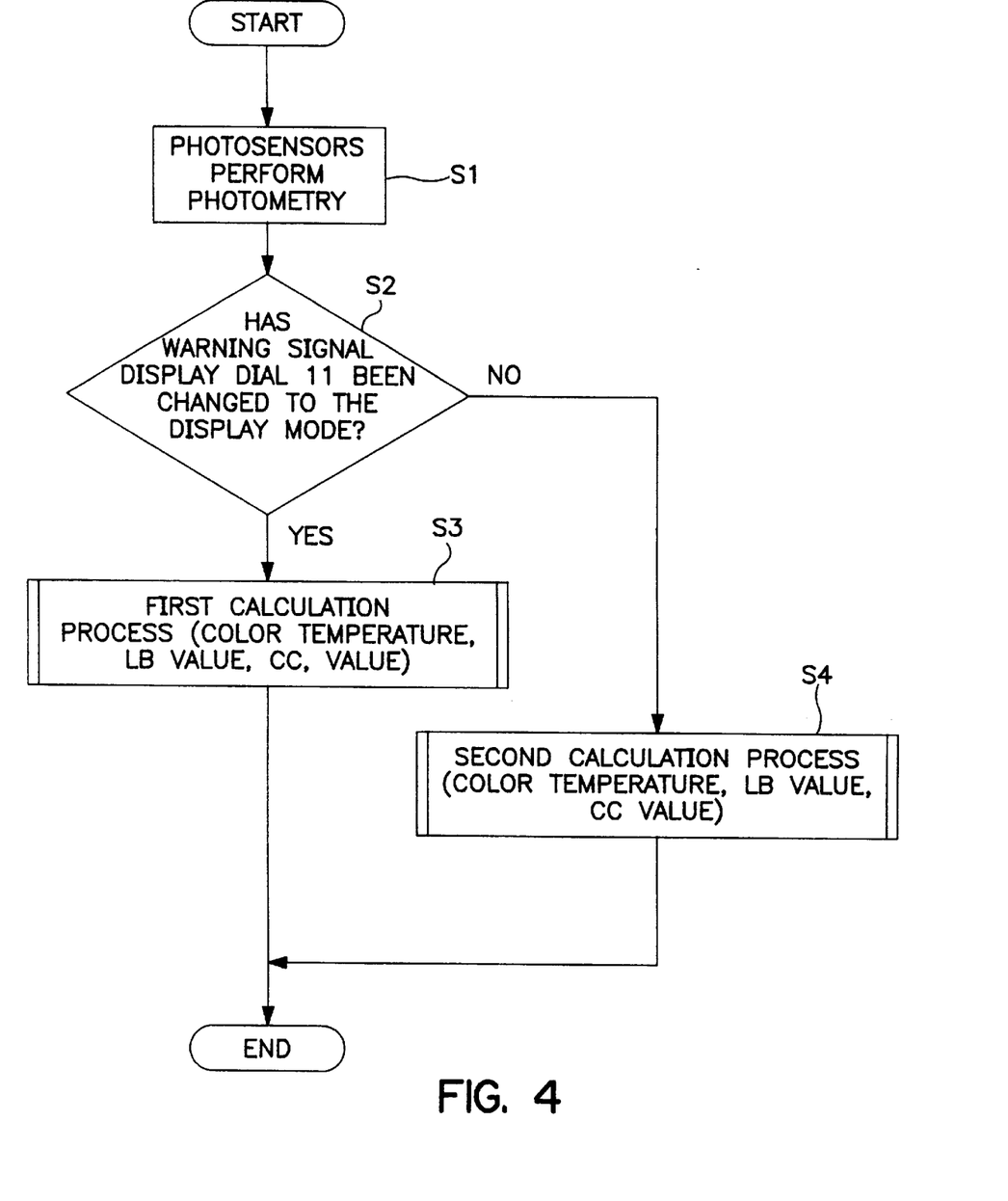
FIG. 4 is a flow chart which describes the operation of the colorimetric device of the first preferred embodiment of the present invention.

The operation process for the colorimetric device as shown in FIG. 4 commences when an interval timer (not shown in the drawing) is started by half depression of the release button (not shown in the drawing) after the main switch (power supply switch)(not shown in the drawing) of the camera has been switched ON.

Firstly, in step S1, the photosensors 71R–73R, 71G–73G, and 71B–73B, which form the photometric element 7, perform photometry of the light of the subject field, divided into three color components R, G, B. The photometric output of the R (red) component obtained by the photosensors 71R–73R, the photometric output of the G (green) component obtained by the photosensors 71G–73G, and the photometric output of the B (blue) component obtained by the photosensors 71B–73B, are then respectively added for each component to give the sensor data (photometric value) $D_R$ of the R component, the sensor data $D_G$ of the G component, and the sensor data $D_B$ of the B component, which are output to the CPU 8.

Next, proceeding to step S2, the CPU 8 determines whether or not the warning signal changeover dial 11 has been changed over to the display mode. When it is determined that the warning signal changeover dial 11 has been changed over to the display mode, it proceeds to the first calculation process of step S3.

Figure 5:
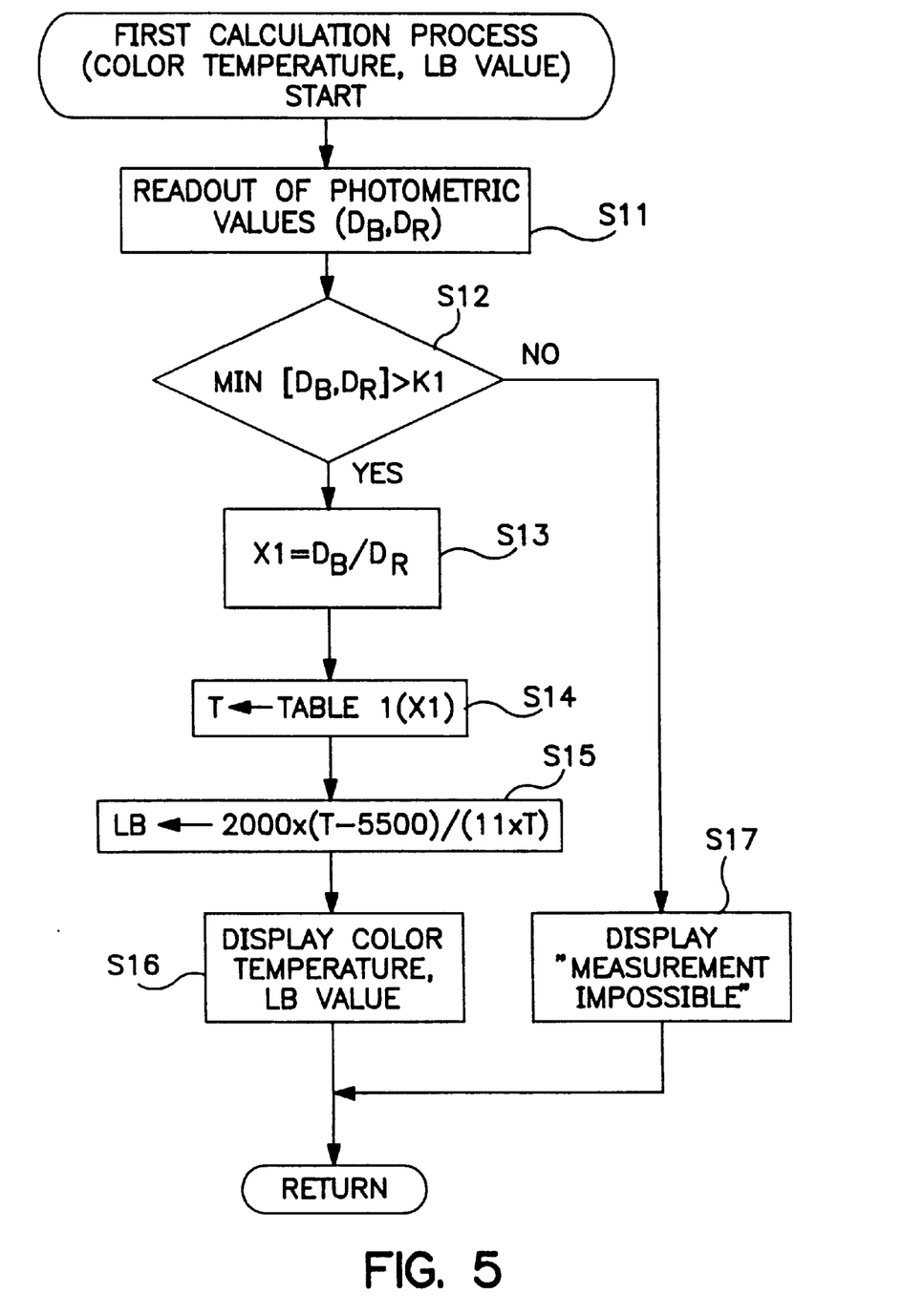
FIG. 5 is a flow chart which describes the process of calculating the color temperature and light balancing (LB) value in the calculation process shown in step S3 of FIG. 4.

FIG. 5 is a flow chart describing the process performed in the case of calculating the color temperature and the light balancing factor (LB value) in the first calculation process shown in step S3 of FIG. 4. First, in step S11, the CPU 8 reads from the photometric element 7 the sensor data $D_B$ of the B component and the sensor data $D_R$ of the R component, and proceeds to step S12.

In step S12, the CPU 8 performs a comparison of the sensor data $D_B$ of the B component and the sensor data $D_R$ of the R component, which have been input from the photometric element 7, with a predetermined standard value K1, already prepared and stored in the CPU 8. K1 is the lowest useful value produced by the sensor data $D_B$, $D_R$, and $D_G$. Then, when it is determined that both the sensor data $D_B$ of the B component and the sensor data $D_R$ of the R component are greater than the predetermined standard value K1, the color temperature and LB value calculated using these sensor data $D_B$ and $D_R$ are taken as having reliability, and the routine proceeds to step S13.

In step S13, the CPU 8 calculates X1=($D_B/D_R$), which is the ratio of the sensor data $D_B$ and $D_R$, and proceeds to step S14.

In step S14, using a table (TABLE1) previously prepared and stored in the CPU 8, the color temperature T (in degrees Kelvin) is found from X1 which was calculated in step S13. TABLE1 is a table including color temperature values and X1 values. Furthermore, proceeding to step S15, the CPU 8 calculates the LB value from this color temperature T, as shown in Equation (1).

$$LB=2000\times(T\times5500)/(11\times T) \quad (1)$$

Next, proceeding to step S16, the CPU 8 causes a display in a predetermined position (described below) of the color data display device 9, of the color temperature T and LB value LB which were found in steps S14, S15, and ends the process.

On the other hand, in step S12, when it is determined that either of the sensor data $D_B$ of the B component or the sensor date $D_R$ of the R component is below the standard value K1, the color temperature and LB value calculated using these sensor data $D_B$ and $D_R$ are taken as not having reliability. The routine proceeds to step S17 where a "measurement impossible" display is displayed (described below) in a predetermined location of the color data display device 9, and the process ends.

Figure 6:
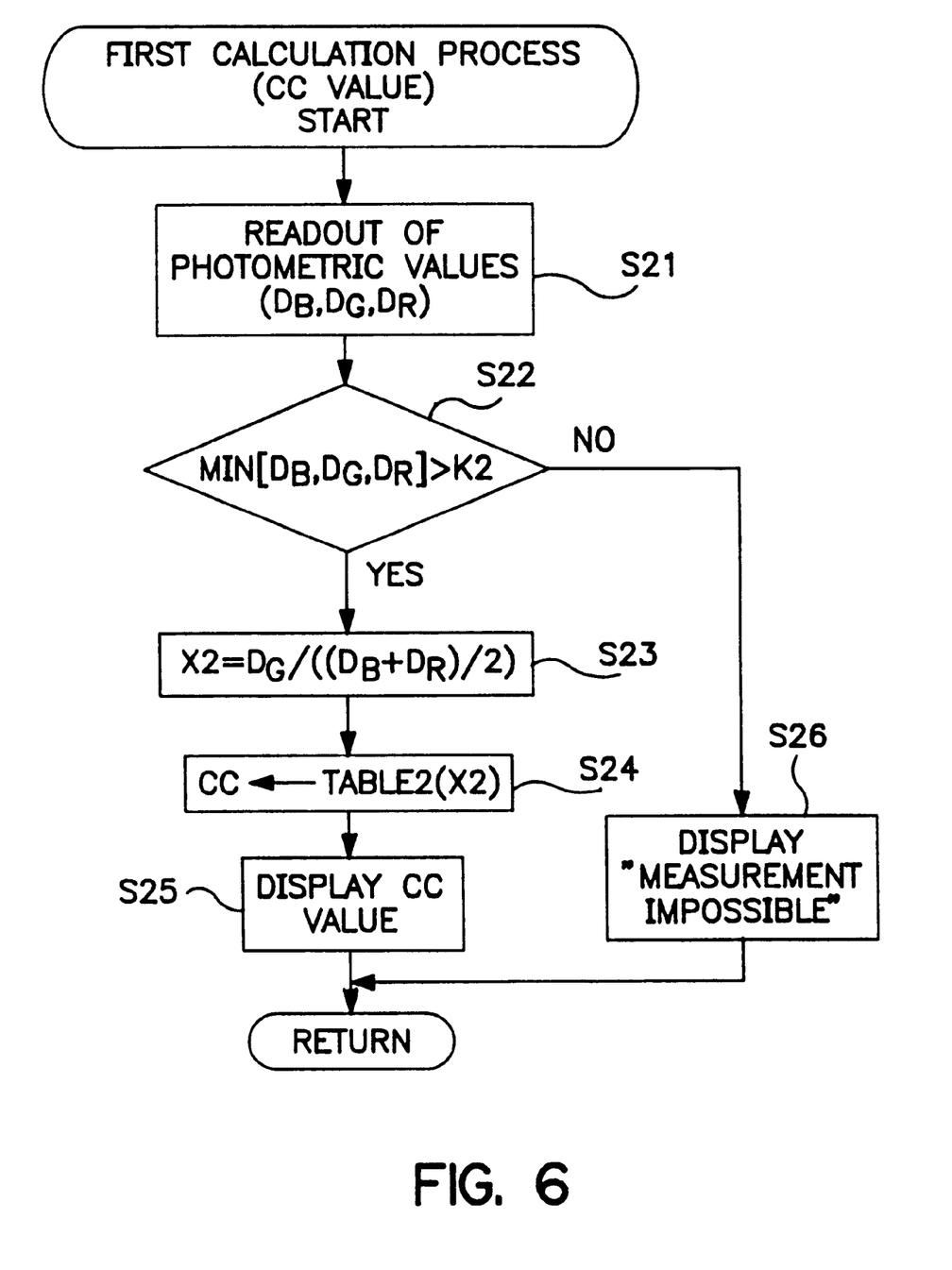
FIG. 6 is a flow chart which describes the process of calculating the color compensating (CC) value in the calculation process shown in step S3 of FIG. 4.

FIG. 6 is a flow chart showing the process of the case in which, within the first calculation process of step S3 shown in FIG. 4, the CPU 8 calculates the color compensating factor (CC value). First, in step S21, the CPU 8 reads in from the photometric element 7 the sensor data $D_B$ of the B component, the sensor data DR of the R component and the sensor data $D_G$ of the G component, and proceeds to step S22.

In step S22, the CPU 8 performs a comparison of the sensor data $D_R$ of the R component, the sensor data $D_G$ of the G component and the sensor data $D_B$ of the B component, which have been input from the photometric element 7, with a predetermined standard value K2, already prepared and stored in the CPU 8. K2 is the lowest useful value produced by the sensor data $D_R$, $D_B$ and $D_G$. Then, when it is determined that all of the sensor data $D_R$, $D_B$ and $D_G$ of the R component are greater than the predetermined standard value K2, the CC value calculated using these sensor data $D_R$, $D_B$ and $D_G$ is taken as having reliability, and the routine proceeds to step S23.

In step S23, the CPU 8 calculates X2 from the following Equation (2), using the sensor data $D_R$, $D_B$ and $D_G$, and proceeds to step S24.

$$X2=D_G/D_B+D_R)/2) \quad (2)$$

In step S24, the CPU 8 finds the CC value CC from the value of X2 calculated in step S23, using a previously prepared table (TABLE2). TABLE2 is a table including CC values and X2 values. Proceeding to step S25, the CC value is displayed on the predetermined position (mentioned below) of the color data display device 9, and ends the process. On the other hand, in step S22, when it is determined that any one of the sensor data DR, DB or DG is below the standard value K2, the calculated CC value is taken as not having reliability, and the routine proceeds to step S26. A "measurement impossible" notice for the CC value is displayed (described below) in a predetermined location (described below) of the color data display device 9, and the process ends.

Figure 7:
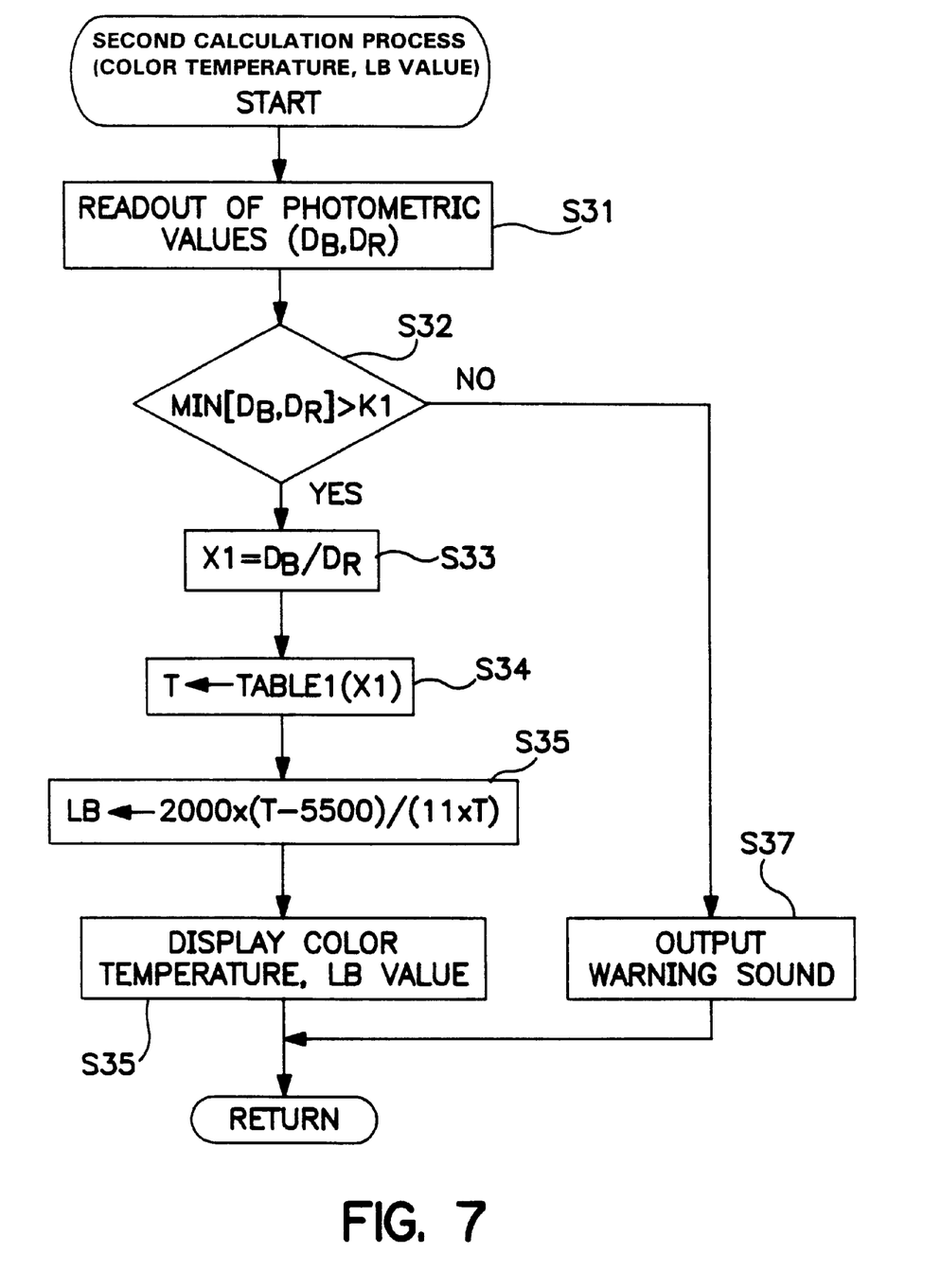
FIG. 7 is a flow chart which describes the process of calculating the color temperature and LB value in the calculation process shown in step S4 of FIG. 4.
Figure 8:
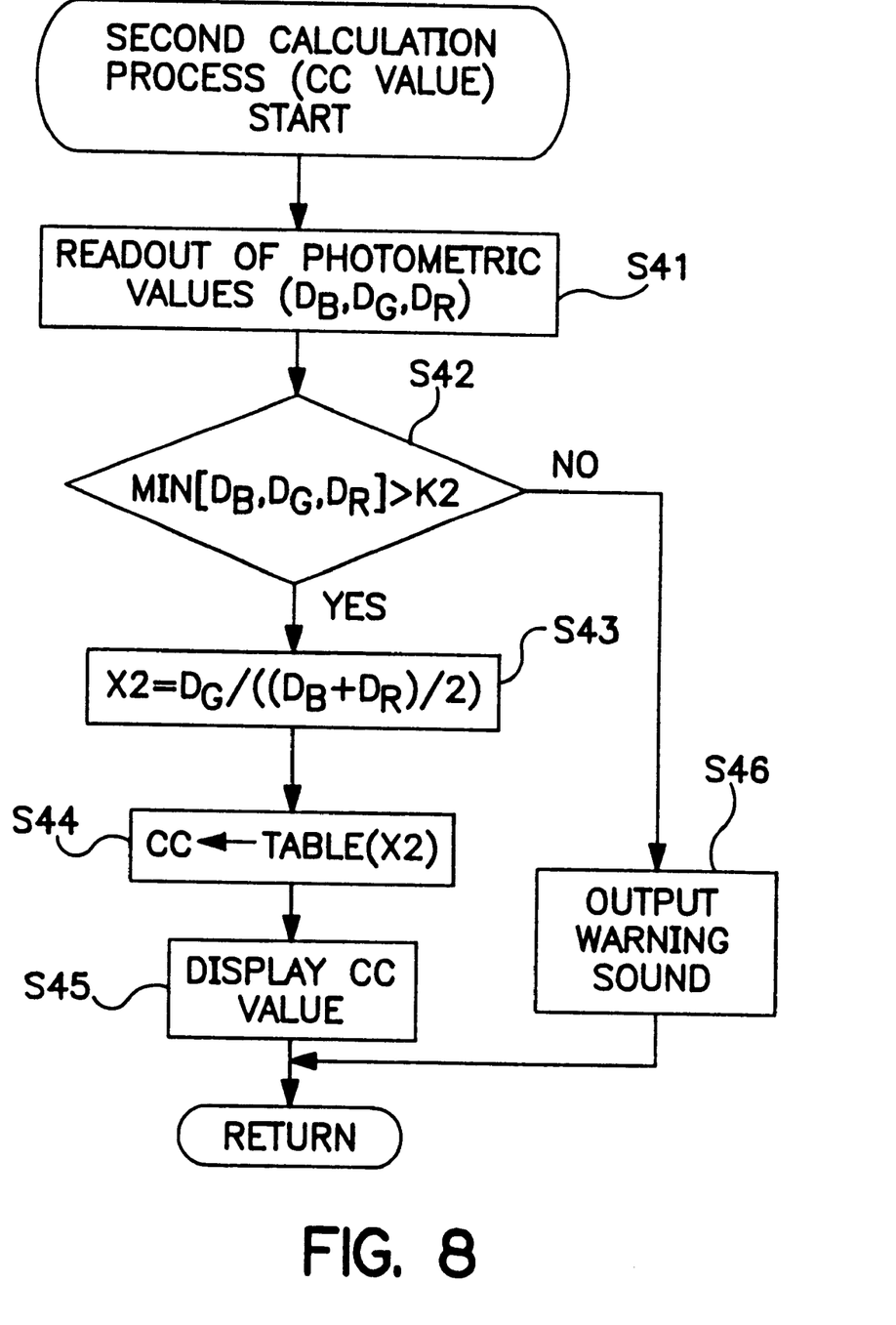
FIG. 8 is a flow chart which describes the process of calculating the CC value in the calculation process shown in step S4 of FIG. 4.

Furthermore, in step S2 of FIG. 4, when it is determined that the warning signal changeover dial 11 is not in the display mode, rather the dial is in the warning sound generation mode, proceeding to step S4, the second calculation process shown in FIGS. 7 and 8 is performed.

FIG. 7 is a flow chart showing the process for the case where the CPU 8 calculates the color temperature and LB value in the second calculation process shown in step S4 of FIG. 4. In this colorimetric process, the process of steps S31–S36 correspond to steps S11–S16 of the flow chart of the colorimetric process shown in FIG. 5.

That is, first, in step S31, the CPU 8 reads from the photometric element 7 the sensor data $D_B$ of the B component and the sensor data $D_R$ of the R component, and proceeds to step 32. In step S32, the CPU 8 determines whether or not both of the sensor data $D_B$ and $D_R$ are greater than the predetermined standard value K1. If the sensor data $D_B$ and $D_R$ are determined to be greater than K1, the routine proceeds to step S33 and calculates X1 (=$D_B D_R$).

Next, proceeding to step S34, the CPU 8 calculates the color temperature T (in degrees Kelvin) from X1 found in step S33, using a previously prepared table (TABLE1), and proceeds to step S35. In step S35, the CPU 8 calculates the LB value according to the above Equation (1) and, proceeding to step S36, displays the color temperature T and the LB value LB in the predetermined position on the color data display device 9. Then, the process ends.

On the other hand, in step S32, if it is determined that either of the sensor data $D_B$ or $D_R$ is below the predetermined standard value K1, the process proceeds to step S37, where the CPU 8 outputs a warning sound as a "measurement impossible" signal for the color temperature and the LB value from the speaker 10, and ends the process.

FIG. 8 is a flow chart showing the process where the CPU 8 calculated the CC value in the second calculation process of step S4 shown in FIG. 4. This colorimetric process of steps S41–S45 corresponds to the process of steps S21–S25 of the flow chart shown in FIG. 6.

Namely, first, in step S41, the CPU 8 reads in from the photometric element 7 the sensor data $D_B$ of the B component, the sensor data $D_R$ of the R component and the sensor data $D_G$ of the G component, and proceeds to step S42. In step S42, the CPU 8 determines whether or not all of the sensor data $D_R$, $D_G$ and $D_B$ which were input from the photometric element 7 are greater than the predetermined standard value K2. When it is determined that they are greater, the process proceeds to step S43 where X2 is calculated by means of Equation (2).

Next, proceeding to step S44, the CPU 8 finds the CC value using a previously prepared table (TABLE2) from X2 which was found in step S43. In step S45, the CC value is displayed in a predetermined position (described below) of the color data display device 9, and ends the process.

On the other hand, when it is determined that any of the sensor data $D_R$, $D_G$ or $D_B$ are below the predetermined standard value K2, the CPU 8 outputs a warning sound from speaker 10 in step S46. The warning sound is a "measurement impossible" signal for reliably calculating the CC value. Then, the process ends.

Figure 9:
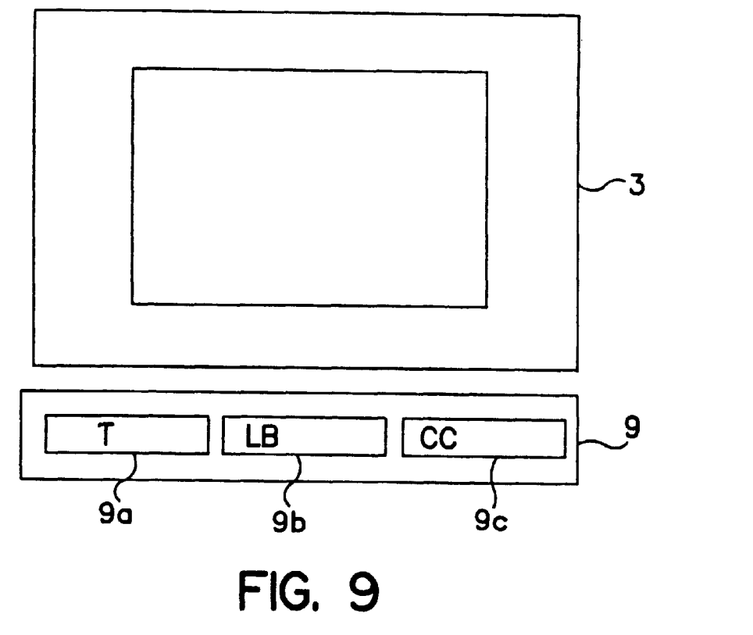
FIG. 9 is a diagram showing a display example of the focusing screen and color data display device, seen through the eyepiece lens for the colorimetric device of FIG. 1.

FIG. 9 is a diagram showing an example of the display of the focusing screen 3 and color data display device 9 which the photographer can see through the viewfinder 20 of the camera via the eyepiece lens 5 of FIG. 1. In the viewfinder 20, the color data display device 9 is arranged in the lower portion of the focusing screen 3. The color temperature T is displayed at a display position 9a on the left-hand side of the color data display device 9, the LB value is displayed at a display position 9b in the center of the color data display device 9, and the CC value is displayed at a display position 9c on the right-hand side of the color data display device 9.

Figure 10A:
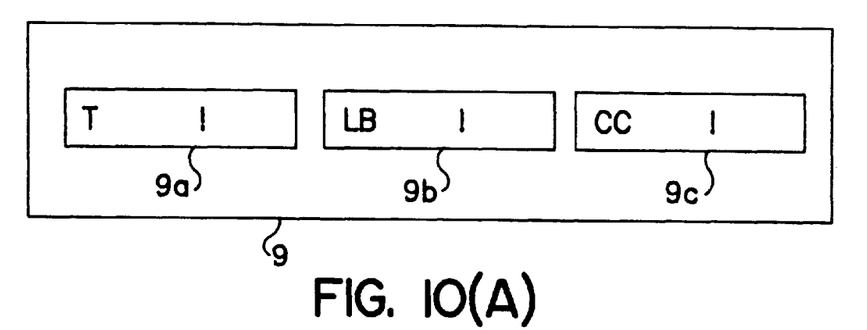
FIGS. 10(A) and 10(B) are diagrams showing display examples of cases in which the color data display device displays "measurement impossible" for the color temperature, LB value and CC value.
Figure 10B:
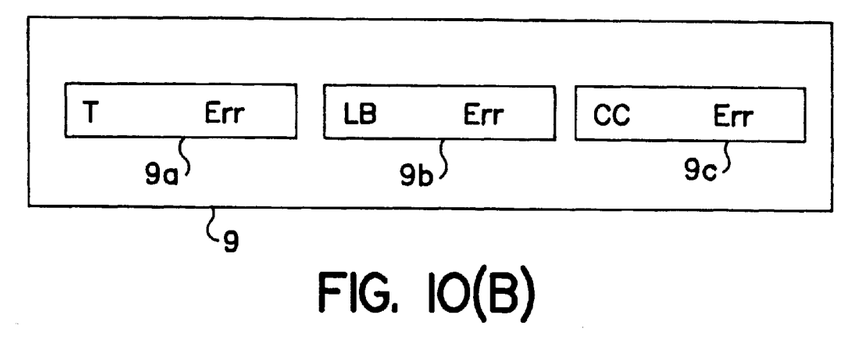

FIGS. 10(A) and 10(B) are display examples of the color data display device 9 when it has been determined that measurement is impossible of the color temperature, LB value, and CC value, when the warning signal changeover dial 11 is changed over to the display mode. In this case, as shown in FIG. 10(A), "!" is used as a "measurement impossible" display, and is displayed in the display positions 9a, 9b and 9c.

Moreover, as shown in FIG. 10(B), "Err" may also be displayed as a "measurement impossible" display, being displayed in display positions 9a, 9b and 9c. Other characters, signals and the like may also be displayed.

In the present embodiment, in the case that the warning signal changeover dial 11 is changed over to the warning sound output mode, different sounds or tones can be used as the warning sounds when it is impossible to measure the color temperature and LB value and for the case where measurement of the CC value is impossible.

Moreover, it is also possible for a warning signal to be output by lighting a LED, the LED being disposed for use as a warning signal on the exterior of the camera body.

Furthermore, in the present embodiment, the method of outputting the warning signal is changed over by the warning signal changeover dial 11, but the output of the warning signal by both the color data display device 9 and the speaker 10 may be caused.

According to the above embodiment of the invention, a determination circuit compares the measurement values of each of a plurality of color components which have been input from the photometric element. In the case that the photometric value of each color component is below the predetermined standard value, a warning output device outputs a warning signal. Because a calculation circuit calculates the color data, in the case that the photometric value of each color component is greater than the standard value, reliable color data is obtained.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A colorimetric device comprising:
   a photometric element to measure a plurality of color components of incident light from a subject field;
   a memory unit to store information;
   a decision circuit to compare measured values of each of the plurality of color components measured by the photometric element with a common predetermined and stored standard photometric value stored in said memory unit, and to decide whether the measured values meet predetermined conditions; and
   a calculating circuit to calculate color data which is used to reproduce the subject field with an appropriate color balance, using the measured values.

2. The colorimetric device according to claim 1, wherein the colorimetric device is used in a camera which photographs the subject field.

3. The colorimetric device according to claim 2, further comprising a warning output device which outputs a warning signal when the decision circuit decides that the measured values do not have the requisite reliability.

4. The colorimetric device according to claim 3, wherein the warning output device displays the warning signal so that the warning signal can be visually perceived.

5. The colorimetric device according to claim 4, further comprising a display device to display the measured values,
   wherein the warning output device causes the display in the display device of at least one of characters, numerals and icons as the warning signal.

6. The colorimetric device according to claim 4, wherein the warning output device outputs a warning sound such that the warning signal can be audibly perceived.

7. The colorimetric device according to claim 3, wherein the warning the output device outputs a warning sound such that the warning signal can be audibly perceived.

8. The colorimetric device according to claim 1, further comprising a warning output device to output a warning signal when the decision circuit decides that the measured values do not have the requisite reliability.

9. The colorimetric device according to claim 8, wherein the warning output device displays the warning signal so that the warning signal can be visually perceived.

10. The colorimetric device according to claim 9, further comprising a display device to display the measured values,
    wherein the warning output device causes the display in the display device of at least one of characters, numerals and icons as the warning signal.

11. The colorimetric device according to claim 9, further comprising a light generating device to generate light;
    wherein the warning output device causes the light generating device to generate the light as the warning signal.

12. The colorimetric device according to claim 8, wherein the warning output device outputs a warning sound such that the warning signal can be audibly perceived.

13. The colorimetric device according to claim 1, wherein the photometric element measures light, separating the incident light from the subject field into red, green and blue color components.

14. The colorimetric device according to claim 1, wherein the photometric element measures light, separating the incident light from the subject field into yellow, magenta and cyan color components.

15. A colorimetric device according to claim 1, wherein said predetermined value is set prior to sampling incident light.

16. A camera having a colorimetric device comprising:
a lens system for imaging a subject field;
a memory unit to store information;
a viewfinder for observing an image of the subject field;
a transmitting mechanism to transmit light from the lens system to the viewfinder;
a photometric element to measure a plurality of photometric values from light components of incident light;
a circuit element to compare the plurality of photometric values with a common predetermined and stored standard value stored in said memory unit to decide if the photometric values meet predetermined conditions; and
a calculating circuit to calculate color data in order to photograph the subject field with an appropriate color balance, using the plurality of photometric values.

17. A camera according to claim 16, wherein said predetermined value is set prior to sampling incident light.

18. A colorimetric device comprising:
a photometric element to measure blue, red, and green color components of incident light from a subject field;
a memory unit to store information;
a decision circuit to compare each measured value of blue and red color components measured by the photometric element with a first predetermined, common and stored standard photometric value stored in said memory unit, and to decide whether each of the measured values is more than the first predetermined, common and stored standard photometric value, and to compare each measured value of blue, red, and green color components measured by the photometric element with a second predetermined, common and stored standard photometric value stored in said memory unit, and to decide whether each of the measured values is more than the second predetermined, common and stored standard photometric value; and
a calculating circuit to calculate color data which is used to reproduce the subject field with an appropriate color balance, using the measured values.

19. The colorimetric device according to claim 18, wherein said each measured value of blue and red color components is not used when at least one of said measured values of blue and red color components is not more than the first predetermined and stored standard photometric value, and said each measured value of blue, red, and green color components is not used when at least one of said measured values of blue, red and green color components is not more than the second predetermined and stored standard photometric value.

* * * * *

UNITED STATES PATENT AND TRADEMARK OFFICE
CERTIFICATE OF CORRECTION

PATENT NO.: 6,021,279
DATED : February 1, 2000
INVENTOR(S): Tsuyako MATSUSHITA It is certified that error appears in the above-identified patent and that said Letters Patent is hereby corrected as shown below:

Column 8, (claim 6), delete current claim 6 and substitute
--6. The colorimetric device according to claim 4, further comprising a light generating device to generate light;
wherein the warning output device causes the light generating device to generate the light as the warning signal.--

Signed and Sealed this

Twentieth Day of February, 2001

Attest:

NICHOLAS P. GODICI

Attesting Officer

Acting Director of the United States Patent and Trademark Office